United States Patent Office 2,903,453
Patented Sept. 8, 1959

2,903,453

QUATERNARY AMMONIUM SALTS OF AMINO-ALCOHOL ESTERS OF N-ALKYLPIPERIDINE CARBOXYLIC ACIDS

John H. Biel, Milwaukee, Wis., assignor to Lakeside Laboratories, Inc., a corporation of Wisconsin No Drawing. Application October 9, 1956
Serial No. 614,816

10 Claims. (Cl. 260—247.2)

This invention relates to the production of novel chemical compounds. More particularly, this invention is concerned with novel derivatives of piperidine carboxylic acids.

This is a continuation-in-part of my copending application, Serial No. 537,277, filed September 28, 1955, now abandoned.

According to the present invention there are provided quaternary ammonium salts of aminoalcohol esters of N-alkylpiperidine carboxylic acids (III) of the formula

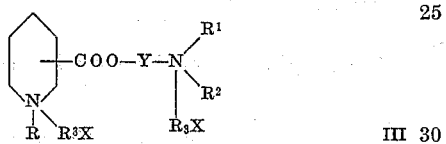

wherein Y is a straight or branched chain alkylene group, usually of 10 carbons or less (and generally of 5 carbons or less), R, $R^1$, $R^2$ and $R^3$ are alkyl groups, preferably lower alkyls, or aralkyl groups such as those in which the aryl is monocyclic such as the phenyl group and the alkyl moiety is a lower alkyl, or $R^1$ and $R^2$ are joined so that the nitrogen is part of a heterocyclic group, preferably of five or six atoms in the ring, and X is a nontoxic anion.

The tertiary bases used in this invention may be conveniently produced by reacting an ester of an N-substituted-piperidine carboxylic acid (I) with an amino alcohol (II). This reaction may be represented as follows:

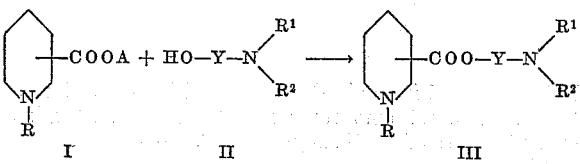

wherein Y, R, $R^1$ and $R^2$ have the significance previously assigned and A is a lower alkyl group.

Some N-alkylpiperidine carboxylic acid esters that may be used in this process are lower alkyl esters of N-alkylpipecolinic acid (—COOH in 2 position), N-alkylnipecotic acid (—COOH in 3 position), and N-alkylisonipecotic acid (—COOH in 4 position) wherein the N-alkyl group may be groups such as the methyl, ethyl, propyl, butyl, sec-butyl and other alkyl groups, saturated and unsaturated and straight and branched chained. In place of the N-alkyl substituent there may be an N-aralkyl group such as N-benzyl, N-phenethyl and the like including such groups in which the phenyl nucleus is otherwise substituted as with a halogen, nitro, or alkoxy group and the like.

The N-disubstituted aminoalcohols useful in this process are the N-dialkyl and N-diaralkyl aminoalcohols in which the alkyl and aralkyl groups are such as listed above as N-substituents on the piperidine moiety. In addition, tertiary aminoalcohols may be used in which the nitrogen atom is in a ring and the alkanol group is on the nitrogen. Examples of compounds which may be used are N-dimethylaminoethanol, N-diethylaminopropanol, N-dipropylaminobutanol, N-dimethylaminohexanol, 3-pyrrolidino-propanol, 2-morpholino-ethanol, 2-piperidino-ethanol and 2-(N'-methyl-N'-o-chlorobenzyl-amino) ethanol.

The reaction is preferably carried out by contacting the N-alkylpiperidine carboxylic acid ester and tertiary aminoalcohol in the presence of an inert neutral solvent such as n-heptane and methylcyclohexane. A small amount of an alkali metal alkoxide, such as sodium methoxide, is generally added to catalyze the reaction. About equimolar amounts of reactants are used to avoid unreacted material after reaction is completed. Elevated temperatures such as the reflux temperature of the mixture are ordinarily used to effect the reaction without undue delay. When an alkyl ester of an N-alkylpiperidine carboxylic acid is used as a reactant, a corresponding alcohol forms as the reaction proceeds. The alcohol distills off at the reflux temperature. When the theoretical amount of alcohol is recovered, the reaction may be considered completed. The desired product is recovered from the reaction mixture by fractional distillation.

Typical of the novel compounds produced by this procedure are 2-dimethylaminoethyl-N-methylnipecotate, 2-diethylaminoethyl-N-ethylnipecotate, 3 - dimethylamino-propyl-N-methylnipecotate, 2-dimethylaminoisopropyl-N-methylnipecotate, 4 - dipropylaminobutyl-N-ethylnipecotate, 2-piperidinoethyl-N-benzylnipecotate, morpholino-ethyl-N-phenethylnipecotate, 2-morpholinoethyl-N-methylnipecotate, 2-pyrrolidinoethyl-N-methylnipecotate, 2-(N'-methyl-N'-o-chlorobenzylamino)ethyl (N-methyl)-nipecotate and the corresponding compounds in which nipecotic acid is replaced by pipecolinic acid and isonipecotic acid. Such compounds are high boiling oils.

Quaternary ammonium salts of such tertiary bases are conveniently prepared by contacting the bases with alkylating agents, preferably in the presence of a suitable organic solvent. Alkylating agents such as lower alkyl halides, including methyl chloride, ethyl bromide, methyl bromide, alkylating agents like methyl and ethyl sulphate as well as aryl substituted alkylating agents like o-chlorobenzyl bromide, phenylethyl chloride and phenylpropyl bromide are representative compounds that may be used to form quaternary ammonium salts of the above described tertiary bases.

The non-toxic bis quaternary ammonium salts of the aminoalcohol esters of the N-substituted piperidine carboxylic acids have useful anti-hypertensive and ganglionic blocking activity. These salts are high melting solids. They may be conveniently administered in the form of essentially pure undiluted compounds if desired, such as in a gelatin capsule. Because such compounds are highly active, however, administrable dosages of the pure compounds ordinarily do not possess a sufficiently large volume to be handled conveniently. There are therefore provided by this invention pharmaceutical compositions comprising a carrier and an active form of at least one of the non-toxic quaternary salts.

The compositions may be readily produced by intimately mixing one or more of the quaternary salts with a pharmaceutical carrier. The carrier may be either a liquid or a solid. When a liquid, it may be used to form solutions or suspensions of the salts. Flavoring substances may be included as desired. Sterile water is the preferred liquid carrier; it readily dissolves the salts to form clear solutions. Isotonic solutions may be employed as parenteral injectable liquids.

Solid pharmaceutical carriers such as starch, sugar, talc and the like may be used to form powders. Such powders may be tableted by the use of suitable lubricants such as magnesium stearate, binders such as gelatin and disintegrating agents like sodium bicarbonate in combination with citric or tartaric acid. The powders may also be used to fill gelatin capsules.

Compositions of the types described may be produced having a wide variety of concentrations of one or more of the active quaternary ammonium salts. They may also be formed in unit-dosages containing pre-determined amounts of active agents which may be administered one or more at a time at regular intervals of time to create and maintain effective body levels of the salt. One typical dosage in No. 3 hard gelatin capsules may be as follows:

| | Mg. |
|---|---|
| 2-dimethylaminoethyl N-methyl nipecotate dimethobromide | 15 |
| Lactose | 200 |
| Starch | 16 |
| Talc | 8 |

The following examples are presented to show specific methods of producing certain of the novel compounds included within this invention. It is understood, however, that these examples are included only for purposes of illustration, and that the invention is not to be restricted to the embodiments specifically disclosed therein.

EXAMPLE 1

*2-dimethylaminoethyl N-methylnipecotate*

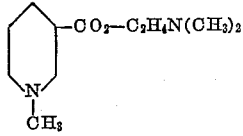

A mixture containing 31.4 g. (0.20 mole) of methyl N-methylnipecotate, 17.8 g. (0.20 mole) of dimethylaminoethanol, 0.5 g. of sodium methoxide and 325 cc. n-heptane is stirred and refluxed until the theoretical amount of methanol has been collected in a Dean-Stark water separator. (It may be necessary to add an additional 0.5 g. of sodium methoxide to obtain a more complete reaction.) The heptane solution is then clarified by filtration and the heptane removed by distillation. The residual oil is subjected to distillation in vacuo and the desired ester collected at 113–115° C. (4 mm.).

EXAMPLE 2

*2-dimethylaminoethyl N-methylnipecotate dimethobromide*

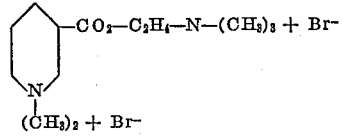

To 10.7 g. (0.050 mole) of the base (Example 1) dissolved in 50 cc. of isopropyl alcohol is added 19.0 g. (0.20 mole) of methyl bromide. The mixture is refluxed for two hours, chilled and the product isolated by filtration. After recrystallization from ethanol the product melts at 230–232° C.

EXAMPLE 3

*2-diethylaminoethyl N-ethylnipecotate*

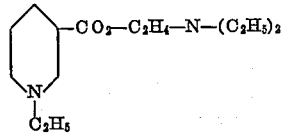

This product is obtained from methyl N-ethylnipecotate and diethylaminoethanol by the transesterification procedure described in Example 1, B.P. 104–106° C. (1–2 mm.).

EXAMPLE 4

*2-diethylaminoethyl N-ethylnipecotate dimethobromide*

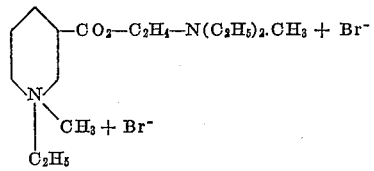

To 12.8 g. (0.050 mole) of the product of Example 3 dissolved in 75 cc. of isopropyl alcohol is added 19.0 g. (0.20 mole) of methyl bromide and the solution refluxed for three hours. On cooling, the crystalline salt precipitates out and is isolated by filtration, M.P. 221–222° C.

EXAMPLE 5

*3-dimethylaminopropyl N-methylnipecotate*

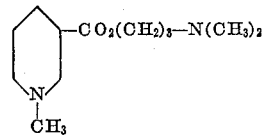

This product is prepared from methyl N-methylnipecotate and 3-dimethylaminopropanol by the transesterification procedure described in Example 1; B.P. 106–109° C. (1 mm.).

EXAMPLE 6

*3-dimethylaminopropyl N-methylnipecotate dimethobromide*

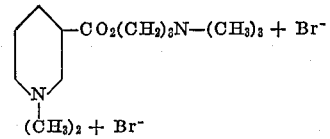

This dimethobromide salt is prepared from the product of Example 5 in the manner described in Example 2; M.P. 238–239° C.

EXAMPLE 7

*2-morpholinoethyl N-methylnipecotate*

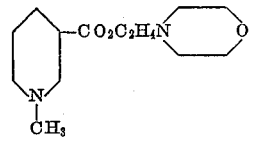

This compound is obtained from methyl N-methylnipecotate and 2-morpholino ethanol by the transesterification method described in Example 1, B.P. 116–120° C. (1 mm.).

EXAMPLE 8

*2-morpholinoethyl N-methylnipecotate dimethobromide*

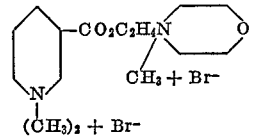

The dimethobromide salt of the product of Example 7 is prepared according to the procedure described in Example 4; M.P. 235–236° C.

EXAMPLE 9

*2-pyrrolidinoethyl N-methylnipecotate*

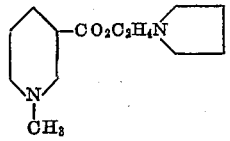

This compound is obtained from methyl N-methylnipecotate and 2-pyrrolidinoethanol by the transesterification method described in Example 1; B.P. 103–105° C. (1 mm.).

EXAMPLE 10

*2-pyrrolidinoethyl N-methylnipecotate dimethobromide*

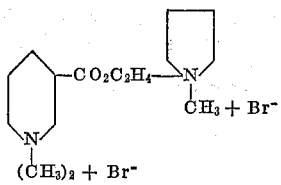

The dimethobromide salt of the product of Example 9 is prepared in the manner described in Example 4; M.P. 209–211° C.

EXAMPLE 11

*2-dimethylaminoisopropyl N-methylnipecotate*

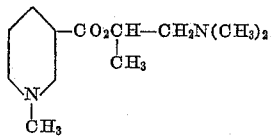

The desired ester is obtained from methyl N-methyl nipecotate and 2-dimethylaminoisopropyl alcohol by the transesterification method described in Example 1; B.P. 137–141° C. (17 mm.).

EXAMPLE 12

*2-dimethylaminoisopropyl N-methylnipecotate dimethobromide*

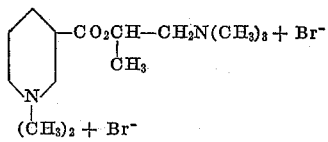

The dimethobromide salt of the basic ester in Example 11 is prepared according to the method described in Example 4; M.P. 255–257° C.

EXAMPLE 13

*2-dimethylaminoethyl N-methylisonipecotate*

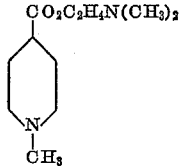

This compound is obtained from methyl N-methylisonipecotate and 2-dimethylaminoethanol by the transesterification procedure described in Example 1; B.P. 95–96° C. (1 mm.).

EXAMPLE 14

*2-dimethylaminoethyl N-methylisonipecotate dimethobromide*

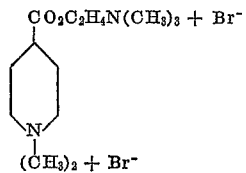

Following the procedure described in Example 4, the dimethobromide salt of the basic ester in Example 13 is prepared; M.P. 276–277° C.

EXAMPLE 15

*2-dimethylaminoethyl-N-methyl-pipecolinate*

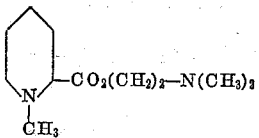

The desired ester is obtained from methyl N-methylpipecolinate and 2-dimethylaminoethanol as described in Example 1; B.P. 145–147° C. (23 mm.).

EXAMPLE 16

*2-dimethylaminoethyl N-methylpipecolinate dimethobromide*

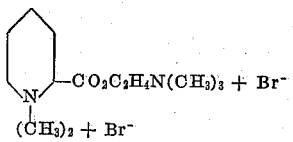

The dimethobromide salt of the product of Example 15 is prepared in the manner described in Example 4; M.P. 245° C. dec.

EXAMPLE 17

*3-dimethylaminopropyl N-methylpipecolinate dimethobromide*

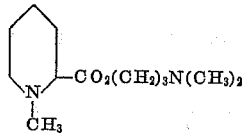

The desired ester is obtained from methyl N-methylpipecolinate and 3-dimethylaminopropanol as described in Examples 1 and 4; B.P. 156–158° C. (23 mm.).

EXAMPLE 18

*2-(N'-methyl-N'-o-chlorobenzylamino) ethyl (N-methyl)pipecolinate*

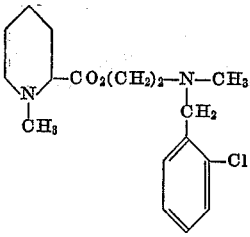

2-(N'-methyl-N'-o-chlorobenzylamino) ethanol is reacted with methyl N-methylpipecolinate acid to form this compound, B.P. 100–105° C./0.5 mm., $N_D^{25}$=1.5227

The dimethiodide salt was formed, M.P. 185° C. dec.

EXAMPLE 19

*2-morpholinoethyl (N-methyl)pipecolinate*

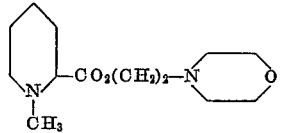

2-morpholinoethanol is reacted with methyl N-methylpipecolinate to form this compound; B.P. 136–138° C./1.2 mm., $N_D^{25}$=1.4831.

The dimethobromide salt was formed, M.P. 233–235° C. dec.

EXAMPLE 20

*2-(N'-methyl-N'-o-chlorobenzylamino) ethyl (N-methyl) nipecotate*

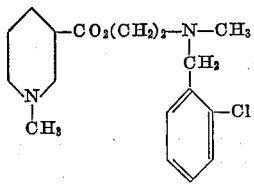

Formed by reacting 2-(N'-methyl - N' - o - chlorobenzylamino)ethanol with methyl (N-methyl)nipecotate, B.P. 148–153° C./0.15 mm., $N_D^{25}$=1.5214.

The dimethiodide salt was formed, M.P. 178–179° C.

Various changes and modifications of the invention can be made and, to the extent that such variations incorporate the spirit of this invention, they are intended to be included within the scope of the appended claims.

What is claimed is:

1. 2-dimethylaminoethyl N-methylpipecolinate di-lower alkyl halide.
2. 3 - dimethylaminopropyl N-methylpipecolinate di-lower alkyl halide.
3. 2-morpholinoethyl N-methylnipecotate di-lower alkyl halide.
4. 2-morpholinoethyl N-methylpipecolinate di-lower alkyl halide.
5. 3-dimethylaminopropyl N-methylnipecotate di-lower alkyl halide.
6. A compound of the group consisting of compounds of the formula

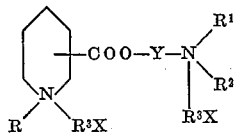

wherein Y is an alkylene group of less than 6 carbons, R is a member of the group consisting of lower alkyl and phenyl-lower alkyl groups, $R^3$ is a lower alkyl group, $R^1$ and $R^2$ are members of the group consisting of lower alkyl groups, phenyl-lower alkyl groups and groups in which $R^1$ and $R^2$ are joined to form a heterocyclic group of the group consisting of morpholino, pyrrolidino and piperidino groups, and X is a nontoxic anion.

7. Compounds of the formula

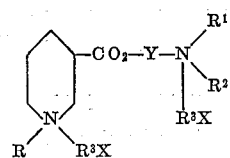

wherein Y is an alkylene group of less than 6 carbons, R, $R^1$, $R^2$ and $R^3$ represent lower alkyl groups and X is a nontoxic halogen.

8. Compounds of the formula

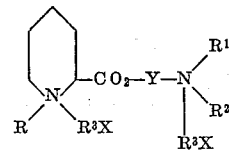

wherein Y is an alkylene group of less than 6 carbons, R, $R^1$, $R^2$ and $R^3$ represent lower alkyl groups and X is a nontoxic halogen.

9. Compounds of the formula

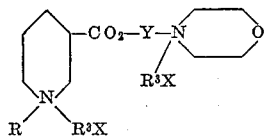

wherein Y is a lower alkylene group of less than 6 carbons, R and $R^3$ represent lower alkyl groups and X is a nontoxic halogen.

10. Compounds of the formula

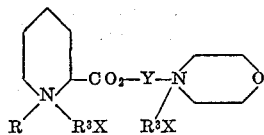

wherein Y is a lower alkylene group of less than 6 carbons, R and $R^3$ represent lower alkyl groups and X is a nontoxic halogen.

References Cited in the file of this patent

Hill et al.: Journal of Organic Chemistry, vol. 19, No. 11, pp. 1802–1806.

Fusco et al.: C.A., vol. 44, January–March 1950, col. 1032g–h.